United States Patent

[11] 3,628,075

| [72] | Inventors | Gene L. Dafler<br>New Lebanon;<br>Wayne V. Fannin, Dayton, both of Ohio |
| --- | --- | --- |
| [21] | Appl. No. | 87,386 |
| [22] | Filed | Nov. 6, 1970 |
| [45] | Patented | Dec. 14, 1971 |
| [73] | Assignee | General Motors Corporation<br>Detroit, Mich. |

[54] BRUSH HOLDER ASSEMBLY FOR DYNAMOELECTRIC MACHINES
4 Claims, 5 Drawing Figs.

[52] U.S. Cl................................................. 310/239,
310/249
[51] Int. Cl...................................................... H02k 13/00
[50] Field of Search........................................... 310/239,
240, 241, 242, 245, 246, 249, 229, 230

[56] References Cited
UNITED STATES PATENTS

| 1,927,176 | 5/1931 | Langley........................ | 310/242 |
| --- | --- | --- | --- |
| 2,129,757 | 9/1938 | Fouques....................... | 310/240 |
| 2,737,605 | 3/1952 | Wagner........................ | 310/241 |
| 3,527,971 | 9/1970 | Means.......................... | 310/239 |

Primary Examiner—D. F. Duggan
Assistant Examiner—R. Skudy
Attorneys—F. W. Christen, C. R. Meland and Robert W. Smith ABSTRACT: In a preferred form, a brush-holder assembly for dynamoelectric machines includes a support plate formed with a yieldable clip for holding a brush in a retracted position by engaging the brush shunt wire. The brush is held retracted to prevent its interference with the machine rotor when the rotor is assembled to a case part. The brush is released by depressing the yieldable clip out of the path of the shunt wire so that the shunt wire is disengaged.

Patented Dec. 14, 1971

INVENTORS
Gene L. Dafler &
BY Wayne V. Fannin

Robert W. Smith
ATTORNEY

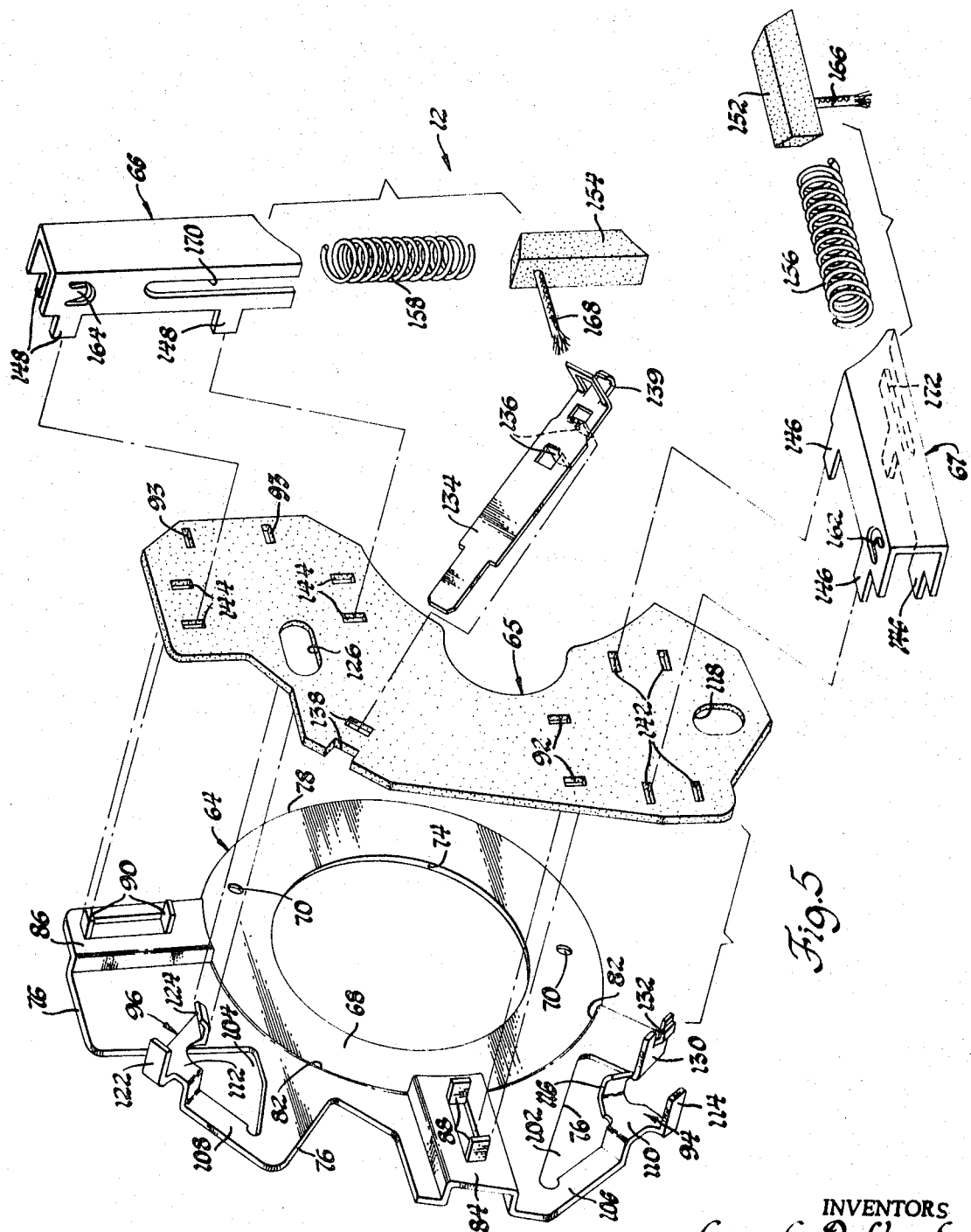

BRUSH HOLDER ASSEMBLY FOR DYNAMOELECTRIC MACHINES

BACKGROUND OF THE INVENTION

This invention relates to brush-holder assemblies for dynamoelectric machines including current collectors and more particularly to brush-holder assemblies having an arrangement for holding the brushes in a retracted position during assembly of the machine parts.

In dynamoelectric machines including current collectors formed by rotating contact assemblies mounted on the machine shaft and including conductive elements of commutators or sliprings, for example, brushes carried by a brush-holder assembly make contact with the conductive elements. A brush biasing spring mounted on the brush holder urges the brushes toward engagement with the rotating contact assembly. This spring causes the brushes to be normally extended from the inner ends of brush-holding receptacles and abut the rotating contact assembly. Prior to the mounting of the rotor shaft to a bearing carried by the end of a case part, it is necessary to retract the brushes so that they will not obstruct insertion of the shaft end into the bearing assembly.

Various arrangements are known for maintaining brushes in a retracted position so as to prevent interference with a rotor part when it is assembled to a bearing. In one arrangement, a U-shaped wire clip engaging the ends of the brushes forces the brushes apart and into retracted positions within the brush-holding receptacles. This arrangement is usually successful, for example, when the brushes are diametrically disposed. After the shaft end is assembled within a bearing so that the brushes are juxtaposed the rotating contact assembly, the wire clip is removed by extracting it from between the casing part and rotor supported therein. Following this, another bearing carried by a second casing part is assembled to the opposite shaft end and the two case parts are secured together to complete assembly of the machine.

Another arrangement for holding brushes in a retracted position is disclosed and claimed in U.S. Pat. No. 3,219,860 for a Brush Rigging For Dynamoelectric Machines, issued Nov. 23, 1965, and assigned to the assignee of this invention. This brush rigging includes a removable rod which extends through one of the machine end frames and the brush holder to hold the brushes retracted until the end frames have been assembled to the ends of the rotor shaft and to the stator assembly.

Some difficulty has been experienced in the use of the U-shaped wire clips where the brushes are not disposed diametrically on the brush holder and when there is little working space remaining for removal of the clips after assembly of the rotor to one of the case parts. Further, an arrangement of the type using a removable rod, used successfully in many instances, may not be desirable when the brushes are to be secured to the brush holder and in a retracted position prior to mounting of the brush holder to a case part. Also, the configuration and arrangement of a case part and a brush holder may not permit proper placement of an opening for receiving a removable rod which is to hold the brushes in a retracted position.

SUMMARY OF THE INVENTION

In accordance with the present invention, a brush-holder assembly for dynamoelectric machines includes a support plate having a brush-holding receptacle for receiving a brush which is reciprocably movable therein and has an integral shunt wire extending from one end. A yieldable clip extends from the support plate so as to engage the shunt wire when the brush is in a retracted position. The yieldable clip holds the brush in a retracted position to prevent interference with assembly of the rotor and case parts. The yieldable clip is disengaged from the shunt wire by being depressed so that the brush is released and is extended to a normally operative position after the rotor is mounted within one of the machine case parts.

One of the objects of this invention is to provide a brush-holder assembly for dynamoelectric machines in which brushes that are normally biased toward an extended position are held in a retracted position without the use of external clips or pins by a yieldable clip formed integrally with the brush-holder assembly that engages the brush shunt wire so that the brush is prevented from moving an extended position.

Another object of this invention is to provide a brush holder for a dynamoelectric machine including a brush which is reciprocally movable within a brush-holding receptacle carried by a support plate and which is biased toward an extended position, wherein the brush is held within the brush-holding receptacle and in a retracted position to prevent interference with the assembly of the machine by a yieldable clip which includes a cantilevered arm carrying a wire engaging projection at its free end in a position axially adjacent an outer end of the brush-holding receptacle so that the brush shunt wire is held taut to force the brush to a retracted position and the shunt wire is released when the wire engaging projection is bent away from the shunt wire to permit the brush to move to an extended position.

And a still further object of this invention is to provide a brush holder for dynamoelectric machines including a support plate carrying brush-holding receptacles having brushes reciprocably mounted therein and biased to an extended position by bush springs, wherein the support plate is formed with yieldable clips defined by laterally extending cantilevered arms terminating at free ends located between a brush-holding receptacle and an electrical terminal connected to a predetermined length of a shunt wire of one of the brushes and wherein the free end of the arm carries an axially extending wire engaging projection that holds the brush in a retracted position by retaining the shunt wire against the force of the brush spring, and further wherein the free end of the arm also carries an axially extending finger aligned with an axial space extending outside the outer diameter of the machine rotor so as to be depressed by a rodlike tool inserted axially between the inner wall of the machine case part and the rotor to displace the wire engaging projections from the shunt wires, whereby the brushes are secured in a retracted position prior to the brush-holder assembly being assembled within the machine case parts and during mounting of the rotor to a case part, and thereafter being quickly and easily released to extended positions.

Further objects and advantages of the present invention will be apparent from the following description, reference being had to the accompanying drawings wherein a preferred embodiment of the present invention is clearly shown.

BRIEF DESCRIPTION OF THE DRAWINGS

FIG. 5 is an exploded perspective view of the brush-holder assembly of this invention.

DESCRIPTION OF A PREFERRED EMBODIMENT OF THE INVENTION

Figure 1:
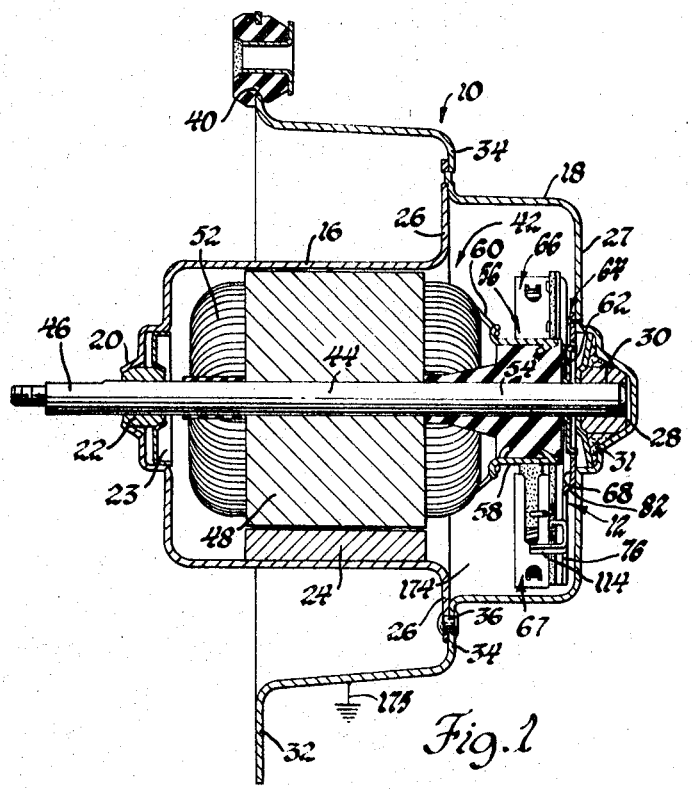
FIG. 1 is a side elevational view in a section taken along line 1—1 in FIG. 2 looking in the direction of the arrows of a dynamoelectric machine including the brush-holder assembly of the present invention.

Referring now to the drawings wherein the same numeral is used to designate the same or like part throughout the several figures and more particularly referring to FIG. 1 wherein a dynamoelectric machine 10 is illustrated including the brushholder assembly of this invention which is generally designated by the numeral 12. For purposes of describing the present invention dynamoelectric machine 10 embodies a direct current motor although the present invention is adaptable to other machines including current collectors of the commutator or slipring type. The motor is of the type disclosed and claimed in U.S. Pat. No. 3,264,506 for a Dynamoelectric Machine, issued Aug. 2, 1966 and assigned to the assignee of this invention. The machine housing is formed by a main case part 16 and commutator case part 18. The case part 16 is cup shaped and is made of sheet metal material terminating in an open ended spherical seat 20 which supports an oil impregnated bearing 22. A spring retainer 23 holds the bearing 22 in place. The case part 16 extends rearwardly from the bearing support end to form a main section carrying permanent magnet field producing stator assembly 24. A radial lip 26 terminates the rearward end of the case part 16.

The case part 18 is cup shaped and is made of a sheet metal material terminating in a closed end 27 having a spherical seat 28 supporting an oil impregnated bearing 30 in axial alignment with the bearing 22. A retainer spring 31 clamps the bearing 30 in place. The case part 18 extends forward to a radial mounting flange 32 and includes a radial section 34 intermediate the ends thereof. The radial section 34 and the radial lip 26 are secured together by means of a rivet 36 so that the case parts 16 and 18 are attached to form the machine housing. The mounting flange 32 has a series of openings 40 including rubber grommets which receive threaded studs for mounting the machine 10 to a support surface, not shown.

The rotor assembly 42 of the dynamoelectric machine 10 includes a shaft 44 journaled for rotation in the bearings 22 and 30. The driving end 46 of the shaft 44 extends through the spherical socket 20 and externally of the machine housing and is adapted for fastening to a driven member such as a fan blower, as described in the aforementioned U.S. Pat. No. 3,264,506. The shaft 44 supports a magnetizable core 48 having winding slots carrying an armature winding 52. The shaft end 54 opposite the driving end 46 supports a rotating contact assembly formed by a commutator 56 having conductive elements formed by copper segments 58. Wire leads 60 of the armature winding 52 are connected to the forward ends of the segments 58. An oil slinger 62 is carried on the shaft end 54 between the commutator 56 and bearing 30.

When current is applied to the commutator 58, in a manner described more fully hereinbelow, the armature winding 52 develops an armature magnetic field which electrodynamically reacts with the permanent magnet field developed by the stator assembly 24 so as to rotate the shaft 44 in a manner understood by those skilled in the art of dynamoelectric machines.

Figure 2:
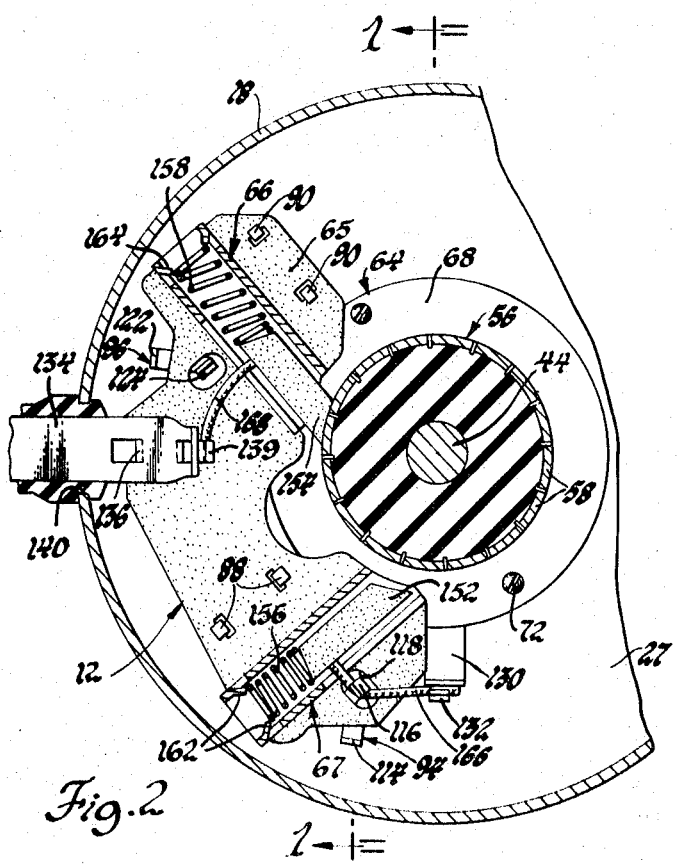
FIG. 2 is a partial end view in section illustrating the brush-holder assembly illustrated in FIG. 1 wherein one brush is shown in a normally operative extended position and a second brush is held in a retracted position in accordance with the present invention.

Referring now more particularly to the brush-holder assembly 12, which forms a principal feature of the present invention, the principal parts are shown in the exploded perspective view of FIG. 5. In FIGS. 1 and 2 the brush-holder assembly 12 is illustrated in its assembled form within the casing part 18 and adjacent the commutator 56. A support plate 64 carried by the inner wall of the casing end section 27 includes an insulating board 65 having brush-holding receptacles 66 and 67 mounted thereon.

The support plate 64, as best shown in FIG. 5, is made of a sheet metal material including a mounting ring 68 having holes 70 for receiving screws 72, shown in FIG. 2, for fastening to the casing end section 27. The inner edge 74, which defines a center opening of the mounting ring 68, has a diameter slightly larger than the diameter of the oil slinger 62 shown in FIG. 1. An outer radial section 76 of the support plate 64 extends arcuately approximately 150° from the outer edge 78 of the mounting ring 68. An axial portion 82 offsets the radial section 76 slightly forward of the mounting ring 68 as also illustrated in FIG. 1.

Two arcuately spaced rectangular surfaces 84 and 86 extend in a common radial plane axially forward from the main part of the radial section 76. Two pairs of bendable tabs 88 and 90 are formed on the rectangular surfaces 84 and 86, respectively. These tabs initially project perpendicularly from the rectangular surfaces 84 and 86 so as to be insertable through corresponding pairs of holes 92 and 93 in the insulating board 65.

The radial section 76 of the support plate 64 further includes yieldable clips 94 and 96 forming a principal feature of the present invention. Open areas 102 and 104 define arms 106 and 108 formed integrally with the radial section 76 and supported in a cantilever fashion. The arm 106 extends laterally from an outer central part of the radial section 76 toward the outer end of the rectangular surface 86. The arm 108 extends laterally at a location adjacent the outer end of the rectangular surface 84. The narrowly spaced, generally parallel sides of the arms 106 and 108 terminate in T-shaped free ends 110 and 112 which are offset axially forward so that the main parts thereof are coplanar with the rectangular surfaces 84 and 86. The free end 110 includes an axially extending finger 114 at the outer side of the T-shaped end that projects forwardly for a distance approximately 4 times the thickness of the insulating board 65. A wire engaging projection 116 at the inner side of the T-shaped free end 110 also extends axially forward for a distance approximately twice the thickness of the insulating board 65.

The projection 116 is curved slightly to form a concave side facing outward and through an opening 118 in the insulating board 65. In a corresponding manner the T-shaped free end 112 of the arm 108 includes a finger 122 on the radially outer side thereof which extends over the outer edge of the insulating board 65 and a wire engaging projection 124 extending through a hole opening 126 formed in the insulating board 65.

Provision for electrical connection to the brush-holder assembly 12 is made by an integral electrical terminal 130 formed at the lower end of the radial section 76 so as to be spaced counterclockwise of the wire engaging projection 116. The terminal 130 extends axially over the outer end edge of the insulating board 65 and includes a deformable wire clamping prong 132. A male or spadelike electrical terminal 134 provides a second electrical connection to the brush-holder assembly 12. The terminal 134 is carried on the forward side of the insulating board 65 and is fastened thereto by an integral pair of spaced tabs 136 inserted through the spaced openings 138 and bent down against the rear side of the insulating board 65. A crimping prong 139 is provided on the inner end of the terminal 134 and the spade terminal 134 extends outward from the brush-holder assembly 12 through an insulated opening 140 in the case part 18. The outer terminal end mates with a female electrical connector, not shown.

The insulating board 65 is made of a suitable sheet insulation material and is carried on the rectangular surfaces 84 and 86. In addition to the holes noted hereinabove, two groups of four holes, 142 and 144, are provided in an orientation that forms the corners of a rectangle having sides parallel with the edges of the rectangular surfaces 84 and 86. The group of holes 142 is located between the rectangular surface 84 and the T-shaped free end 110 of the yieldable clip 94. The group of holes 144 is located between the rectangular surface 86 and the T-shaped free end 112 of the yieldable clip 96. These groups of holes determine the location of the brush-holding receptacles 67 and 66, respectively, as described more fully hereinbelow.

The insulating board 65 is carried on the rectangular surfaces 84 and 86 and held in place by the tabs 88 and 99 which extend through holes 92 and 93 and are bent downward against the forward face of the board. Accordingly, the rear face engages the rectangular surfaces 84 and 86 and T-shaped ends 110 and 112 with the remaining portion being spaced from the remaining portions of the radial section 76. The space between the insulating board 65 and radial section 76 prevents electrical contact between the radial section 76 and electrically conductive parts mounted on the forward face of the insulating board as described hereinafter.

The brush-holding receptacles 66 and 67 are made of a sheet metal material, are substantially identical, and include three sides, each connected at a 90-degree angle with an adjacent side. Pairs of facing sides include groups of tabs 146 and 148 mating with the groups of holes 142 and 144, respectively. The brush-holding receptacles 66 and 67 are mounted to the insulating board 65 by bending the groups of tabs 146 and 148 against the rear face of the board. Accordingly, rectangular chambers are formed by the sides of the brush-holding receptacles 66 and 67 and the forward face of the board 65. Brushes 152 and 154 made of conventional carbon or carbon-graphite brush materials are reciprocably movable within the chambers defined by the brush-holding receptacles 66 and 67.

The outer ends of the brush-holding receptacles contain brush biasing springs 156 and 158 formed of a helical spring wire material and are held in place by tabs 162 and 164 formed in the sides of the brush-holding receptacles. The brushes 152 and 154 resiliently compress the springs 156 and 158 so that they are urged outward from the inner ends of the brush-holding holding receptacles to an extended position as clearly shown by positions of the brush 154 and spring 158 in FIG. 2. The orientation between the brushes 152 and 154 is such that they engage segments 58 of the commutator 56 that are spaced approximately 90° apart.

The brushes 152 and 154 include shunt wires 166 and 168, respectively, which are attached to the outer brush ends. Elongated slots 170 and 172 in the sides of the brush-holding receptacles 66 and 67 facing the terminals 130 and 134 receive the shunt wires 166 and 168, respectively. The brush shunt wire 166 is clamped to the prong 132 of the electrical terminal 130. This provides one polarity at the brush 162 since it is electrically connected to the case parts 16 and 18 which are electrically grounded at a convenient point 175 as shown in FIG. 1. The shunt wire 168 is fixed to the prong 139 of the electrical terminal 134 for connection to an opposite polarity of a direct current supply source. For example, a positive pole of a battery is connected to the terminal 134 with the negative pole being connected through ground connections to the casing point 175. Thereby, the brush 154 supplies positive poled current and the brush 152 supplies the negative poled current. Accordingly, in a positive direction of current flow, current passes from terminal 134, through shunt wire 168, the brush 154 to the commutator 56. Current is then conducted through the armature winding 52 and back to the commutator 56, the brush 152, shunt wire 166, terminal 130 and to ground.

When the brush-holder assembly 12 is finally assembled and includes the brushes 152 and 154, the T-shaped ends 110 and 112 of the arms 106 and 108 terminate at locations between the brush-holding receptacle 66 and the terminal 130 and between the brush-holding receptacle 67 and the terminal 134, respectively. Each of the free ends of the shunt wires 166 and 168 are clamped at predetermined distances from the respective brushes 152 and 154 so as to be engaged by the concave faces of the wire engaging projections 116 and 124 to hold the brushes in a retracted position. With the free ends of the shunt wires 166 and 168 secured, the projections 116 and 124 effectively hold the brushes 152 and 154 outwardly against the brush springs 156 and 158 with shunt wires 166 and 168 being pulled in a taut condition by the compressive force of the brush springs. The brush 152 is shown in the retracted position in FIGS. 2 and 3, as it is held by the yieldable clip 94. It is understood that the yieldable clip 96 is effective to engage the shunt wire 168 so as to maintain the brush 154 in a similar retracted position as shown for brush 152.

The arms 106 and 108 are formed so that they are yieldable in an axial direction parallel to the axis of the shaft 44. Accordingly, they are capable of being depressed axially rearward toward the end of the case part 18 thereby withdrawing the projections 124 and 116 from engagement with the shunt wires 168 and 166.

In assembling the dynamoelectric machine 10, the brush holder 12 is in an assembled condition with the brushes 152 and 154 held in the brush-holding receptacles 66 and 67 in a retracted position by means of the yieldable clips 94 and 96. The shunt wires 166 and 168 will have been previously connected to the electrical terminals 130 and 134. The support plate 64 is then mounted to the end section 27 of the case part 18 by means of the screws 72.

The rotor assembly 42 is then mounted to the case part 18 by inserting the shaft end 54, supporting the commutator 56 and oil slinger 62, in the bearing 30 so that the brushes 152 and 154 are in the proper axial location relative to the center portions of the segments 58. As indicated by illustrated retracted position of the brush 152 in FIGS. 2 and 3, there is provided ample radial clearance between the commutator 56 and the brush-holder assembly 12 to facilitate assembly of the rotor assembly 42 and case part 18. At this point in the assembly operation, the arms 106 and 108 are in a first or forward axial position with the projections 116 and 124 engaging the shunt wires 166 and 168. Also, the fingers 114 and 122 are radially located in an exposed axial space 174 between the outer diameter of the magnetizable core 48 and the inner sidewall of the case part 18.

Figure 3:
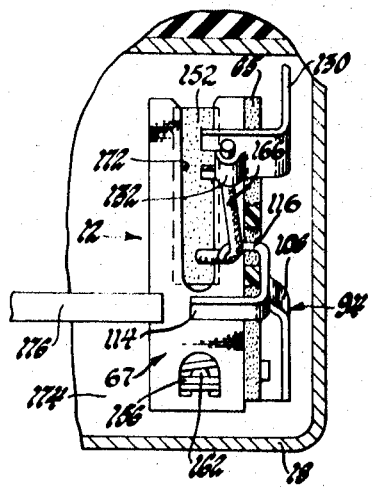
FIG. 3 is an enlarged fragmentary side view of the brush-holder assembly of this invention having a brush held in a retracted position prior to being released by application of a tool.
Figure 4:
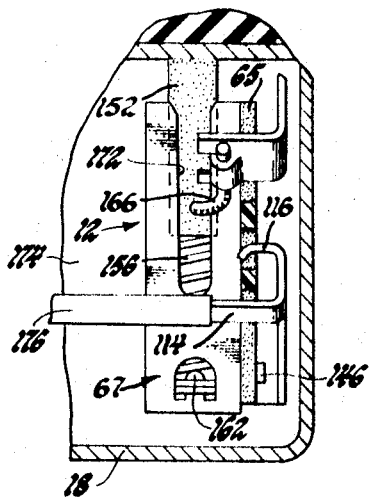
FIG. 4 illustrates the brush-holder assembly of FIG. 3 having a brush being released by application of the tool.

A suitable elongated or rodlike tool 176 is inserted through the exposed axial space toward engagement with the exposed end of either of the fingers 114 and 122, as illustrated in FIG. 3. The tool is manually pressed axially rearward to depress the fingers 114 and 122, as shown in FIG. 4. This bends the arms 106 and 108 to a second or rearward axial position so that the T-shaped free ends 110 and 112 are in an operative position in which the projections 116 and 124 are withdrawn from the path of the shunt wires 166 and 168. Thereby, the brushes 152 and 154 are released and are biased by the resilient force of the brush springs 156 and 158 into engagement with the segments 58 of the commutator 56. The tool 176 is extracted through the exposed axial space 174, whereupon the arms 106 and 108 remain bent in the second or rearward axial position as they were forced into by the pressure of the tool 176. This prevents further interference of the projections 116 and 124 with the shunt wires 166 and 168.

While the embodiment of the present invention as herein disclosed constitutes a preferred form, it is to be understood that other forms may be adopted. For example, the construction of the brush-holder assembly may be formed of a single molded plastic part forming the support plate 64 and brush-holding receptacles 66 and 67. A separate electrical terminal would replace the integral terminal 130 and the yieldable clips 94 and 96 would be detachably connected to the radial section 76. In this form the arms 106 and 108 would break under the pressure of the tool 176 and drop from inside of the case part 18.

What is claimed is:

1. A brush holder for a dynamoelectric machine having a housing, a rotor assembly carried by a shaft journaled for rotation in said housing including a winding and a rotating contact assembly connected to said winding, said brush holder comprising: a support plate mounted on an internal wall of said housing; a brush-holding receptacle carried by said support plate adjacent said rotating contact member; a brush having a shunt wire, said brush being mounted in said brush-holding receptacle and slidable therein between a retracted position and an extended position with said shunt wire extending externally of said brush-holding receptacle; resilient means for biasing said brush to said extended position for engagement with said rotating contact assembly; an electrical terminal of the machine attached to said shunt wire; and a yieldable clip formed integrally on said support plate, said yieldable clip extending between said brush-holding receptacle and said electrical terminal and being movable between a first axial position and a second axial position, said yieldable clip extending across the path of said shunt wire in said first axial position to engage said shunt wire so as to hold said brush in said retracted position, and said yieldable clip being removed from said path of said shunt wire in said second axial position, whereby said yieldable clip is movable from said first axial position to said second axial position to disengage said shunt wire and release said brush to said extended position.

2. A brush holder for a dynamoelectric machine having a housing, a rotor assembly carried by a shaft journaled for rotation in said housing including a winding and a rotating contact assembly connected to said winding, said brush holder comprising: a support plate including a mounting portion and a radial section extending from an outer edge of said mounting portion, said mounting portion being attached to one end of said housing; a brush-holding receptacle including side portions carried by said radial section adjacent said rotating contact member; a brush having a shunt wire extending from one end thereof, said brush being mounted in said brush-holding receptacle and slidable therein between a retracted position and an extended position with said shunt wire extending across one of said side portions; resilient means for biasing said brush to said extended position toward engagement with said rotating contact assembly; an electrical terminal of the machine carried by said radial section of said support plate and located arcuately from said one of said side portions, said terminal being attached to the free end of said shunt wire at a predetermined distance from said brush; and a yieldable clip including a wire engaging projection and finger member formed integrally in said radial section so as to be movable between a first axial position and a second axial position, said wire engaging projection extending axially between said brush-holding receptacle and said electrical terminal and being engageable with said shunt wire when in said first axial position so as to hold said brush in said retracted position and being withdrawn from the path of said shunt wire when in said second axial position, said finger member being manually movable to move said wire engaging projection from said first axial position to said second axial position whereby said shunt wire is released to thereby permit said brush to move to said extended position.

3. A brush holder for a dynamoelectric machine having a housing, a rotor assembly carried by a shaft journaled for rotation in said housing including a winding and a rotating contact assembly connected to said winding, said brush holder comprising: a support plate mounted on an internal wall of said housing; a brush-holding receptacle including side portions carried by said support plate and radially aligned with said rotating contact member, one of said side portions including an elongated slot; a brush having a shunt wire, said brush being mounted in said brush-holding receptacle and slidable therein between a retracted position and an extended position with said shunt wire extending through said elongated slot; resilient means for biasing said brush to said extended position toward engagement with said rotating contact assembly; an electrical terminal carried by said support plate and arcuately spaced from said one of said side portions with one end of said electrical terminal being connected to said shunt wire; and a yieldable clip formed integrally on said support plate including a cantilever supported arm terminating in a movable free end and extending between said brush-holding receptacle and said electrical terminal, one portion of said free end including a wire engaging projection adapted to extend across the path of said shunt wire for engaging said shunt wire when said arm is in a first axial position so as to hold said brush in said retracted position, said free end further including a finger member aligned with an exposed axial space which is formed after assembling said rotor assembly to one end of said housing, and further being adapted to be manually engaged to move said arm to a second axial position where said aire engaging projection is removed from said path of said shunt wire, whereby manual movement of said arm from first axial position to said second axial position disengages said shunt wire and releases said brush to said extended position.

4. A brush holder for a dynamoelectric machine having a housing, a rotor assembly carried by a shaft journaled for rotation in said housing including a winding and a rotating contact assembly connected to said winding, said brush holder comprising: a support plate including a mounting ring for securing said brush holder on an internal wall of said housing and further including a radial section extending from an outer side of said mounting ring; an insulating board fastened to said radial section; a pair of brush-holding receptacles including side portions carried by said insulating board and radially aligned with said rotating contact member, one of said side portions of each brush-holding receptacle including an elongated slot; a pair of brushes having shunt wires attached to the outer ends thereof, each of said brushes being mounted in one of said brush-holding receptacles and slidable therein between a retracted position and an extended position with said shunt wires extending through said elongated slots; resilient means for biasing each of said pair of brushes to said extended position for engagement with said rotating contact assembly; a pair of electrical terminals carried by said support plate so that each is spaced adjacent one of said side portions with each of said electrical terminals being connected to a shunt wire of an adjacent brush; and a pair of yieldable clips formed integrally in said radial section including a pair of cantilever supported arms terminating in free ends whereby each of said yieldable clips extends separately between one of said brush-holding receptacles and an adjacent electrical terminal, said free ends including wire engaging projections extending through said insulating board and being adapted to engage said shunt wire when said arm is in a first axial position so as to hold said brush in said retracted position, said free ends further including finger members aligned with an exposed axial space which is formed after assembling said rotor assembly to one end of said housing, and further being adapted to be engaged by a tool inserted through said exposed axial space to manually move said arms to a second axial position where said wire engaging projections are removed from the path of said shunt wire, whereby yielding movement of said arm from said first shunt wire and releases said brush to said extended position for engagement with said rotating contact assembly.

* * * * *